United States Patent Office 3,170,297
Patented Feb. 23, 1965

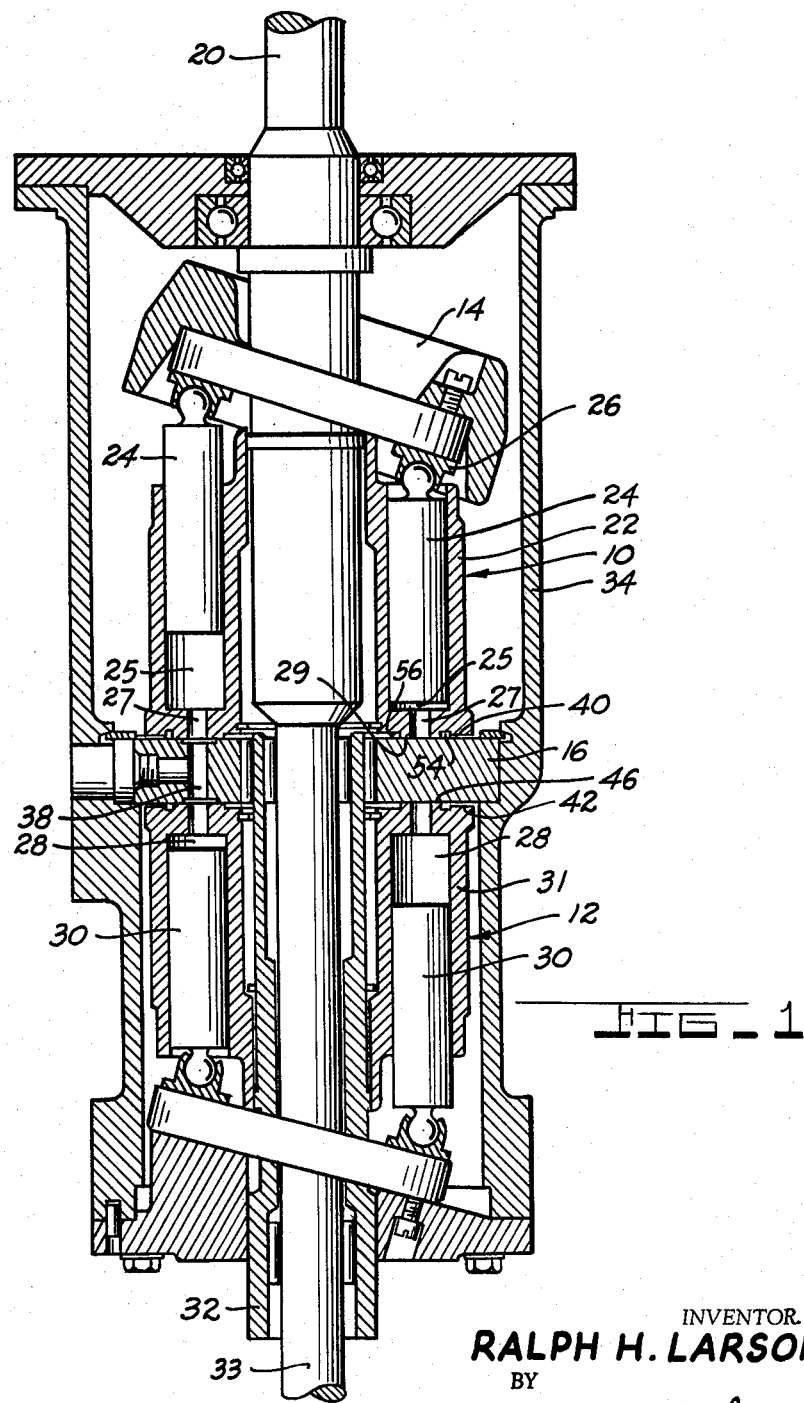
FIG_1
INVENTOR.
RALPH H. LARSON.
BY
ATTORNEY.

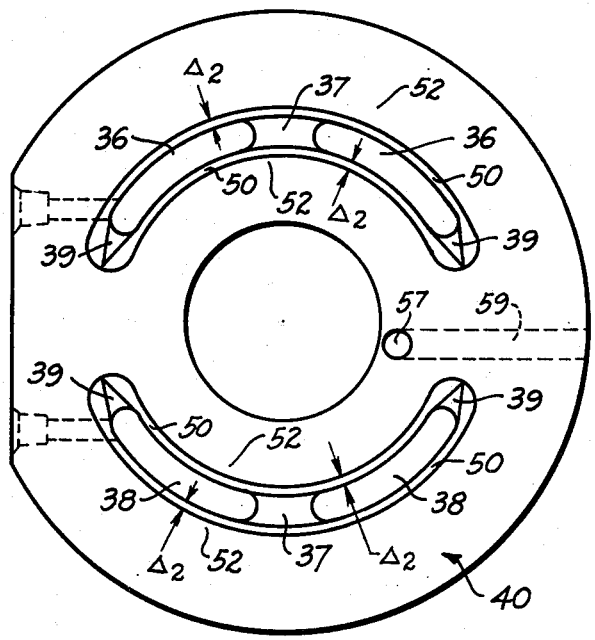
FIG_2
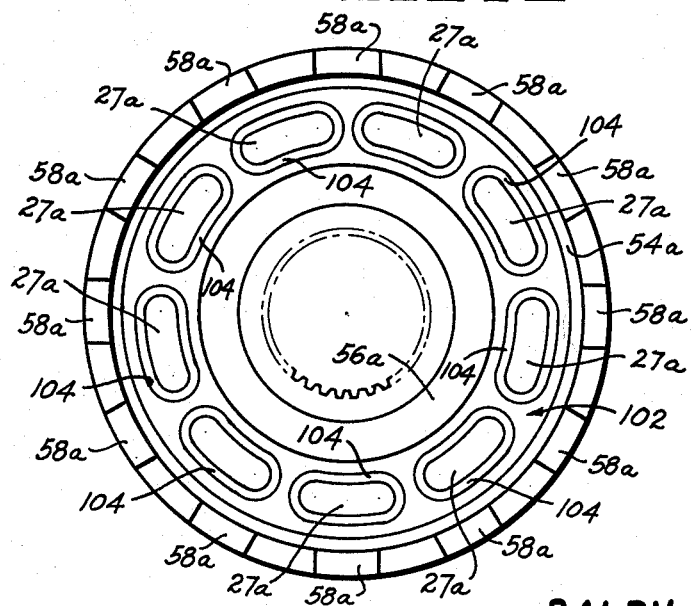
FIG_7

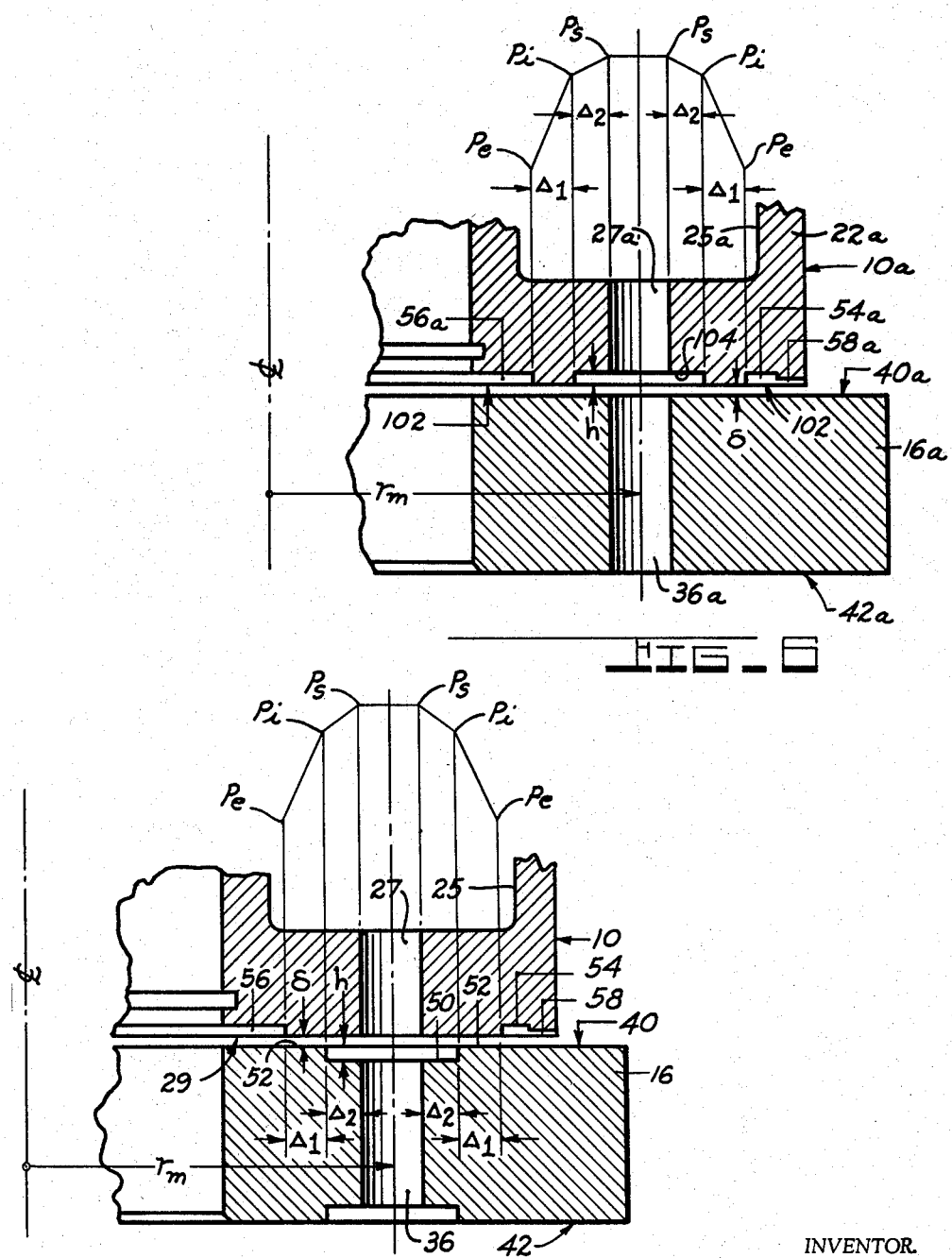

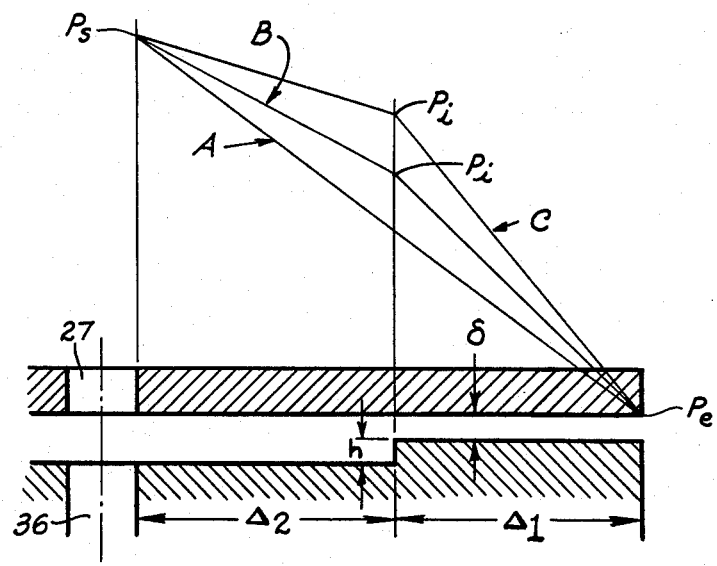
FIG_4
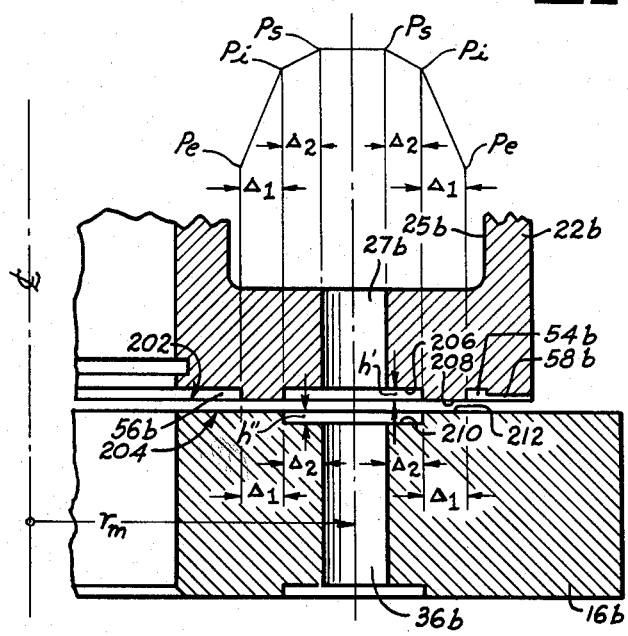
FIG_5
INVENTOR.
RALPH H. LARSON.
BY
*Sheldon F. Raizes*
ATTORNEY.

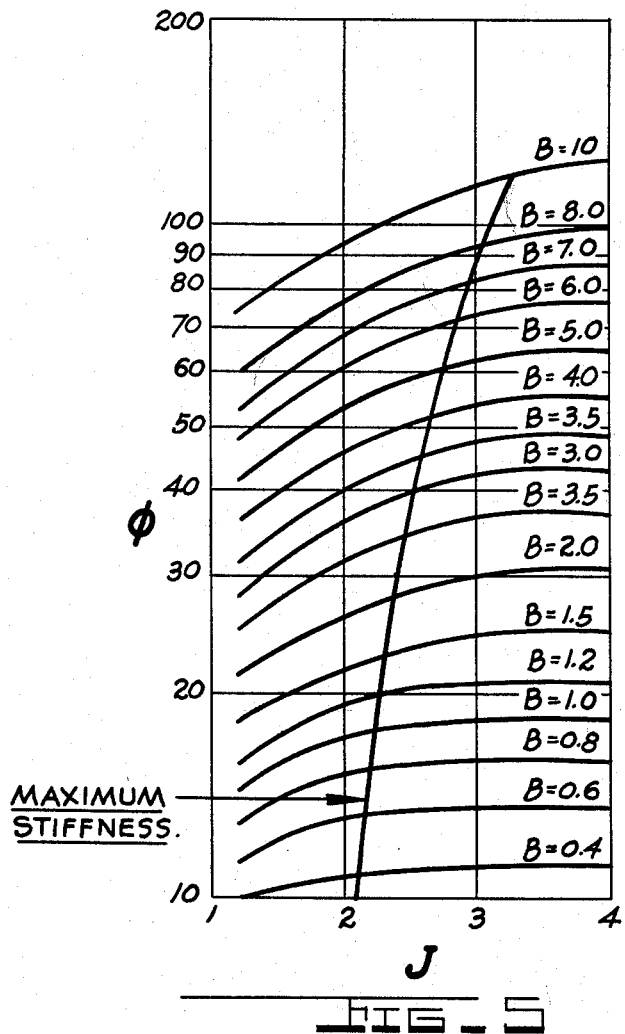
FIG_5

3,170,297
HYDROSTATIC THRUST BEARING DEVICE
Ralph H. Larson, Southfield, Mich., assignor to The Bendix Corporation, Southfield, Mich., a corporation of Delaware
Filed Sept. 30, 1963, Ser. No. 312,381
19 Claims. (Cl. 60—53)

This invention relates to hydrostatic bearings for use in a fluid displacement apparatus.

In most piston type commercial pumps and fluid motors, the port plate supports the external loads exerted on the cylinder barrel. This causes two major disadvantages. The first disadvantage is associated with performance. Due to irregularities in the opposed contacting faces of the cylinder barrel and the port plate or due to tilting of the cylinder barrel, fluid enters therebetween. The contacting faces, which are generally flat, define fluid flow paths radially outward and inward, across which the pressure decreases logarithmically. Since the pressure distribution does not vary as the gap of the flow path changes, the force exerted on the cylinder barrel contacting face by the fluid between the contacting faces is constant for any given cylinder pressure. If the external load acting on the cylinder barrel to press the barrel toward the port plate varies such that it is less than the fluid force exerted on the contacting face of the cylinder barrel, the cylinder barrel will be "blown" away from the port plate opening a gap therebetween through which leakage may occur beyond an acceptable rate and if the external load varies such that it is greater than the fluid force, the opposed contacting faces of the cylinder barrel and the port plate might seize and fail, especially during high speeds of the cylinder barrel rotation. The second disadvantage is that a design of the port plate and cylinder barrel combination must be arrived at through a trial and error testing process before a satisfactorily performing unit can be built.

Accordingly, one of the objects of this invention is to support one of two relatively slidable members on a thin film of fluid located between the opposing faces of the members, in order that the opposing faces will not contact each other.

Another object of this invention is to provide two relatively slidable members with opposed relatively slidable faces whose geometric flow path causes fluid flowing therebetween to act on the faces in such a manner as to provide a hydrostatic bearing which is self-compensating to support widely varying thrust and transverse torque loads.

Still another object of this invention is to provide two relatively slidable members with opposed relatively slidable faces which define a geometric flow path which may be readily designed for certain given conditions and which will produce predictable results.

Other objects of the invention will become apparent from the following description with reference to the drawings wherein:

FIGURE 1 is an angular section view in elevation of a back-to-back pump and motor;

FIGURE 2 is a plan view of a port plate illustrated in section in FIGURE 1;

FIGURE 3 is a partial section in elevation of a cylinder barrel and port plate illustrated in FIGURE 1;

FIGURE 4 is a simplified graphic illustration of the principle of the invention;

FIGURE 5 is a graph;

FIGURE 6 is a view similar to that of FIGURE 3, only of a modified embodiment of the invention;

FIGURE 7 is a bottom view of the cylinder barrel of the modification illustrated in FIGURE 6; and FIGURE 8 is a view similar to that of FIGURE 3, only of another modified embodiment of the invention.

Referring to FIGURE 1, there is illustrated a well known back-to-back pump 10 and motor 12. This is a conventional arrangement and does not form a part of the present invention. The variable displacement (positive) axial piston pump 10 of the swash plate 14 type and the constant displacement axial piston motor 12 are connected hydraulically to each other through a common valving or port plate 16. An engine turns a power shaft 20 which rotates a pump rotor or cylinder barrel 22 carrying pistons 24 which reciprocate within a respective one of a plurality of chambers 25 as the rotor is turned. The stroke of the pistons is determined by the angle of the swash plate 14; the pistons being in slidable contact with the swash plate 14 through slippers 26. Each chamber 25 has a port 27 opening onto an end face 29 of the cylinder barrel 22 which is opposite the port plate 16. The output of the pump 10 is then transmitted through a port in the valve plate 16 into a plurality of chambers 28, in which a plurality of pistons 30 are reciprocable, thereby effecting rotation of a cylinder barrel 31 which drives a motor sleeve 32. The motor sleeve 32 is drivingly coupled (not shown) to any suitable member which the motor 12 is to drive and the end 33 of the power shaft 20 is drivingly coupled to the same member to provide a split mechanical and hydraulic drive. One example of a back-to-back motor-pump arrangement is given in U.S. application Serial Number 208,437 filed on July 9, 1962, and assigned to The Bendix Corporation (common assignee).

The port plate 16 is fixedly secured to the casing 34 of the pump 10 and motor 12 assembly and has a pair of kidney shaped ports 36 and 38 opening into a pair of faces 40 and 42 opposing a respective one of the faces 29 and 46 of the cylinder barrels 22 and 31, respectively. A reinforcing web 37 extends between the walls of each port for strengthening the port plate 16 and manufacturing precompression V-notches 39 are located at each end of the kidney ports. One of the kidney ports serves as an inlet port for the pump and an outlet port for the motor, and the other of the kidney ports serves as an outlet port for the pump and an inlet port for the motor depending upon the angle of the swash plate 14.

One of the purposes of this invention is to support the rotors on a thin film of fluid flowing between the opposing faces of the cylinder barrels and the port plate.

Referring to FIGURES 2 and 3, the fluid flow path between the cylinder barrels and the port plate is defined by the port plate face 40 or 42, which is recessed or stepped at the peripheral edge of each kidney port 36 and 38, and a generally flat opposing surface on a respective cylinder barrel. Each recess comprises a surface 50 offset by a distance $h$ from the surrounding surface 52 of its respective face and extends a radial width of $\Delta_2$ in the direction of flow from the edge of its respective port. An annular groove 54, communicated to ambient pressure by a plurality of passages 58, and an annular step or cut-out 56, communicated to ambient pressure by a passage 57, 59 in the port plate, are located on each cylinder barrel and communicate the fluid entering between the opposing faces to ambient pressure inside the casing. Therefore, that portion of the surrounding surface 52 which extends to the groove 54 and cut-out 56, or a radial distance of $\Delta_1$ in the direction of flow from the edge of the recess, is the effective portion of the fluid flow path.

Referring to FIGURE 4, the principle of the invention is graphically illustrated. Line A represents the pressure distribution along the radial length of the opposed force of the cylinder barrel and port plate when the faces are flat. If one of the opposing faces is modified to be step shaped or recessed, then the pressure distribution assumes the shape of curve B. Pressure curve C represents the pressure distribution change when the step depth $h$ is increased while maintaining a constant gap $\delta$ between the surface surrounding the recess and its opposed face or when the gap $\delta$ between the opposed surfaces is decreased while maintaining the recess depth $h$ constant. The last feature illustrates that an increase in the thrust load on the cylinder barrel will decrease the gap $\delta$ until the bearing load capacity rises to equally oppose the thrust load, or upon a decrease in the thrust load, the initial fluid force moves the cylinder barrel away from the port plate until the bearing load capacity drops a sufficient amount to equally oppose the decreased thrust load. Therefore, the bearing has internal compensation which allows it to support widely varying loads. (The curves A, B and C have been illustrated as comprising straight lines rather than logarithmic curves which are approximately straight since in the following analysis, parallel flow rather than radial flow is assumed resulting in the curves A, B and C for parallel flow comprising straight lines.)

It will be noted from the characteristics of curves B and C, the performance of the bearing depends upon the radial width $\Delta_2$ of the recess, the radial width $\Delta_1$ of the surface surrounding the recess, the depth $h$ of the recess, and the gap $\delta$ between the surface surrounding the recess and the cylinder block. In order to determine their relationships, the following analysis with reference to simplified FIGURE 3 is necessary. FIGURE 3 illustrates a partial cross section of only one chamber of the cylinder barrel 22 and one port of the port plate 16. It is to be understood that the same analysis would apply to the opposed surfaces 42 and 46 of the port plate 16 and cylinder barrel 31, respectively.

Let:
$P_e$=Ambient pressure p.s.i.
$P_i$=Pressure at the step (p.s.i.g. with $P_e$ as a base pressure).
$P_S$=Supply pressure (p.s.i.g. with $P_e$ as a base pressure).
$K_1$=Constant.
$r_m$=Mean radius of the bearing.

Instead of performing an exact analysis utilizing radial flow of the fluid over the bearing, a simplified analysis is set forth below assuming parallel flow over the bearing since the difference in radii between the inner and outer edges of the bearing and the centerline radius of the kidney port is very small compared to the overall radius to the kidney port. The simplified analysis has the advantage of producing a simpler and more workable family of curves for design purposes than if an exact analysis was used.

Mass flow is proportional to the pressure drop and the cube of the clearance, and is inversely proportional to the length in the direction of the flow.

$M_2$=Flow across the bearing width $\Delta_2$:

$$M_2 = \frac{K_1(P_s - P_i)(h+\delta)^3}{\Delta_2} \quad (1\text{-A})$$

$M_1$=Flow across the bearing width $\Delta_1$:

$$M_1 = \frac{K_1(P_i - P_e)(\delta)^3}{\Delta_1} \quad (1\text{-B})$$

Since $P_e$ is ambient and serves as a base for gage pressure, the pressure drop across width $\Delta_2$ is $P_i$ and $P_e$ drops out.

For flow continuity, Equations 1–A and 1–B must be equal. Equating the two equations we find that:

$$P_i = \frac{P_s(h+\delta)^3 \Delta_1}{\delta^3 \Delta_2 + (h+\delta)^3 \Delta_1} \quad (1\text{-C})$$

To determine the total load capacity F of the bearing, the volume under the pressure curve must be taken:

$$F = 2\pi r_m \left[ 2\frac{(P_s + P_i)\Delta_2}{2} + 2\frac{(P_i + P_e)\Delta_1}{2} \right] \quad (1\text{-D})$$

Since $P_e$ is ambient and is the base for gage pressure, $P_e$ drops out. Substituting Equation 1–C for $P_i$.

$$F = 2\pi r_m P_s \left[ \frac{\Delta_2 + (h+\delta)^3 \Delta_1 \Delta_2}{\delta^3 \Delta_2 + (h+\delta)^3 \Delta_1} + \frac{(h+\delta)^2 \Delta_1^2}{\delta^3 \Delta_2 + (h+\delta)^3 \Delta_1} \right] \quad (1\text{-E})$$

Let $$J = \frac{\delta + h}{\delta} \quad (1\text{-F})$$

Let $$B = \frac{\Delta_2}{\Delta_1} \quad (1\text{-G})$$

Equation 1–E then takes the form:

$$F = 2\pi r_m P_s \Delta_1 \left[ \left(\frac{J^3}{J^3 + B}\right)(1+B) + B \right] \quad (1\text{-H})$$

Let $$\phi = \frac{F}{\Delta_1 r_m P_s}$$

which is a dimensionless parameter then $$\phi = \frac{F}{\Delta_1 r_m P_s} = 2\pi \left[ \left(\frac{J^3}{J^3 + B}\right)(1+B) + B \right] \quad (1\text{-I})$$

To find the bearing load-deflection characteristic, we let X equal the increment change in $\delta$ upon an increment change in the external load.

Let $\delta_0$ be the initial clearance

Then $$(\delta = (\delta_0 - X)) \quad (2\text{-A})$$

Let $J_0$=the value of $J$ at $\delta_0$

Then $$J_0 = \frac{h + \delta_0}{\delta_0} \quad (2\text{-B})$$

Let $$e = \frac{x}{\delta_0}$$

Substituting $(\delta_0 - X)$ for $\delta$ in Equation 1–F $$J = \frac{h + (\delta_0 - X)}{(\delta_0 - X)} = \frac{\frac{h+\delta_0}{\delta_0} - \frac{X}{\delta_0}}{\frac{\delta_0 - X}{\delta_0}} \quad (2\text{-C})$$

Then Equation 2–C becomes:

$$J = \frac{J_0 - e}{1 - e} \quad (2\text{-D})$$

Substituting $$\frac{J_0 - e}{1 - e}$$

for J in Equation 1–I results in:

$$\phi = \frac{F}{\Delta_1 r_m P_s} = 2\pi \left[ \frac{(J_0 - e)^3(1-B)}{(J_0 - e)^3 + B(1-e)^3} + B \right] \quad (2\text{-E})$$

To find the rate of change in $\phi$ with respect to the deflection ratio $e$, Equation 2–E is differentiated with respect to $e$ giving:

$$\frac{d\phi}{de} = \frac{dF}{dx} \cdot \frac{\delta_0}{\Delta_1 r_m P_s} = 6\pi B(1+B)\left[\frac{(J_0-e)^3(1-e)^2 - (J_0-e)^2(1-e)^3}{[(J_0-e)^3 + B(1-e)^3]^2}\right] \quad (2\text{-F})$$

To find the rate of change in $\phi$ at the operating or designed gap $\delta_0$, X will be equal to zero and $e=0$; and Equation 2–F becomes:

$$\frac{d\phi}{de_0} = \frac{dF}{dX_0} \cdot \frac{\delta_0}{\Delta_1 r_m P_s} = 6\pi B(1+B)\left[\frac{J_0^3 - J_0^2}{(J_0^3 + B)^2}\right] \quad (2\text{-G})$$

Let $\xi$=stiffness at the operating gap. An alternate and more useful form of Equation 2–G is obtained by multiplying both sides by $(J_0-1)$:

$$\xi = \frac{dF}{dX_0}\frac{h}{\Delta_1 r_m P_s} = 6\pi B(1+B)\left[\frac{J_0^2(J_0-1)^2}{(J_0^3+B)^2}\right] \quad (2\text{-H})$$

Since Equation 2–H is the stiffness when $X=0$, then $\delta=\delta_0$ from Equation 2–A and $J_0=J$ from Equation 2–B. Substituting J for $J_0$, Equation 2–H becomes:

$$\xi = \frac{dF}{dX_0}\frac{h}{\Delta_1 r_m P_s} = 6\pi B(1+B)\left[\frac{J^2(J-1)^2}{(J^3+B)^2}\right] \quad (2\text{-I})$$

It is most desirable to design a bearing of a given capacity and of optimum stiffness. From Equation 1–I it can be seen that $\phi$ is a function of B and J:

$$\phi = F_1(B,J) \quad (3\text{-A})$$

The stiffness $\xi$ at the operating gap $\delta$ is also a function of B and J:

$$\xi = F_2(B,J) \quad (3\text{-B})$$

Solving for J in Equation 3–A:

$$J = F_3(\phi,B) \quad (3\text{-C})$$

Substituting Equation 3–C for J in Equation 3–B:

$$\xi = F_4(\phi,B) \quad (3\text{-D})$$

By taking the derivative of $\xi$ with respect to B and setting the derivative equal to zero, the relationship between $\phi$ and B for maximum stiffness is found:

$$\frac{d\xi}{dB} = F_5(\phi, B) = 0 \quad (3\text{-E})$$

Substitute the relationship between B and $\phi$ from Equation 3–E into Equation 3–C for B and solve for J;

$$J = F_6(\phi) \quad (3\text{-F})$$

which gives the optimum value of J for a given dimensionless load $\phi$. By combining Equations 3–A and 3–F to eliminate $\phi$, an expression of the form:

$$J = F_7(B) \quad (3\text{-G})$$

results, which is the relationship between B and J which will provide maximum stiffness.

The graph of FIGURE 5 illustrates a family of curves, determined by Equations 3–A through 3–G, from which a bearing may be designed. To utilize the graph, $\phi$ is first computed, using realistic values for F, $\Delta_1$, $r_m$, and $P_s$. Then B and J values are selected which intersect on the $\phi$ line and on or near the maximum stiffness line to give a bearing design for optimum performance. The intersection of B and J may deviate somewhat from the maximum stiffness line and still produce a good bearing. In fact, since the analysis used was simplified rather than exact, a bearing designed from the simplified analysis will differ slightly from one designed by an exact analysis. From this we see that another feature of the bearing is its low sensitivity to changes in the design parameters such as may be caused by manufacturing errors.

Through experience, it has been found that in typical bearing sizes $\phi$ will lie between 10 and 120, that J lies between 2 and 4, and that B will lie between 0.4 and 10. It has also been found that for acceptable leakage $\delta$ must be less than .001 inch and for practical performance not less than .0001 inch. Since $h=(J-1)\delta$, h must be between .0001 and .003 inch. Thus a bearing comprising a ratio of $$\frac{\Delta_2}{\Delta_1}$$

between 0.4 and 10 and having a step depth h between .0001 and .003 inch is capable of producing a hydrostatic bearing of the qualities aforementioned providing that they are of the correct relationship according to the conditions and size of the pump.

It should be noted that the bearing capacity F was determined for a stepped bearing covering a full 360°. However, as noted in FIGURE 2, the combined stepped surfaces surrounding ports 36 and 38 do not cover a full 360°. This may be compensated for by dividing $$\frac{F}{\Delta_1 r_m P_s}$$

by the proportion of 360° the step bearing extends and then picking the corresponding B and J values. This will be true for any step bearing which does not cover a full 360°.

Referring to FIGURES 6 and 7, a modification of the embodiment of FIGURES 1–3 is illustrated. Those elements which are the same as in the previous embodiment are given like reference numerals with an "a" affixed thereto. The cylinder barrel face 102 has a plurality of recessed portions 104 adjacent the peripheral edge of the ports 27a while the opposing port plate face 40a is flat. The characteristics of and the relationship between $\Delta_1$, $\Delta_2$, h and $\delta$ effect the same functional results as those of the prior configuration. The embodiment of FIGURE 7 may be modified by connecting the recessed portions located on the same radius providing two annular steps embracing a plurality of ports 27a therebetween.

Referring to FIGURE 8, another modification is illustrated. Those elements which are the same as in the previous embodiment are given like reference numerals with a "b" affixed thereto. The cylinder barrel face 202 is recessed adjacent the peripheral edge of each port and the opposing port plate face 204 is recessed adjacent the edge of each port. The recessed surface 206 adjacent each port of the cylinder block face 202 is offset a distance $h'$ from its surrounding surface 208 and each recessed surface 210 adjacent the ports of the port plate face 204 is offset a distance $h''$ from its surrounding surface 212. In designing this embodiment, $h=h'+h''$. The characteristics of and the relationship between $\Delta_1$, $\Delta'$, $\delta$ and $(h'+h'')$ effect the same functional results as those of the prior configurations.

It should also be noted that another feature of this bearing is its inherent transverse anugular stiffness due to its internal compensation feature.

While the invention has been described with reference to specific embodiments, I intend to include within the scope of the following claims the equivalents which are apparent to those skilled in the art.

I claim:
1. In a fluid displacement apparatus: a cylinder block having at least one fluid displacement chamber therein opening into a respective port on one end face thereof, a valving plate located opposite said end face and having at least one port oppening into the face opposite said end face for communicating with said cylinder block port, said opposed faces providing a fluid flow path therebetween, first and second means for communicating said opposed faces to ambient pressure in said apparatus, said first means being spaced radially inwardly from each of said ports and said second means being spaced radially outwardly from each of said ports, one of said faces comprising a recessed portion located between its respective said port and one of said means, said recessed portion being located adjacent to and intersecting the peripheral edge of its respective port, the depth of said recessed portion being within the range of .0001" and .003", the ratio of the width of said recessed portion to the distance said one means is spaced therefrom being between 0.4 and 10.

2. In a fluid displacement apparatus: a cylinder block having at least one fluid displacement chamber therein opening into a respective port on one end face thereof, a valving plate located opposite said end face and having at least one port opening into the face opposite said end face for communicating with said cylinder block port, said opposed faces providing a fluid flow path therebetween, a pair of means for communicating said opposed faces to ambient pressure in said apparatus, one of said means being spaced radially inwardly from each of said ports and the other of said means being spaced radially outwardly from each of said ports, one of said faces comprising recessed portions located between its respective said port and each of said means, each of said recessed portions being located adjacent to and intersecting the peripheral edge of its respective port, the depth of each recessed portion being substantially equal and within the range of .0001″ and .003″, the ratio of the width of the recessed portion located between its respective port and said one means to the distance said one means is spaced therefrom being between 0.4 and 10, the ratio of the width of the recessed portion located between its respective port and said other means to the distance said other means is spaced therefrom being between 0.4 and 10.

3. A fluid displacement apparatus as recited in claim 2 wherein said one opposed surface is located on said port plate.

4. A fluid displacement apparatus as recited in claim 3 wherein said one means comprises an annular cut-out and said other means comprises an annular groove.

5. A fluid displacement apparatus as recited in claim 4 wherein said one face is recessed adjacent to and intersecting the entire peripheral edge of its respective port.

6. In a fluid displacement apparatus: a cylinder block having a plurality of fluid displacement chambers therein opening into a plurality of respective ports on one end face thereof, a valving plate located opposite said end face and having a plurality of ports opening into the face opposite said end face for communicating with said cylinder block port, said opposed faces providing a fluid flow path therebetween, first and second means for communicating said opposed faces to ambient pressure in said apparatus, said first means being equally spaced radially inwardly from each of said ports of said cylinder block face and from each of said ports on said valving plate face and said second means being substantially equally spaced radially outwardly from each of said ports of said cylinder block face and from each of said ports on said valving plate face, one of said faces comprising recessed portions located between each of said ports and one of said means, each of said recessed portions being located adjacent to and intersecting the peripheral edge of its respective port, the depth of each recessed portion being substantially equal and within the range of .0001″ and .003″, the width of each recessed portion being substantially equal, the ratio of the width of each recess to the distance said one means is spaced therefrom being between 0.4 and 10.

7. In a fluid displacement apparatus: a cylinder block having a plurality of fluid displacement chambers therein opening into a plurality of respective ports on one end face thereof, a valving plate located opposite said end face and having a plurality of ports opening into the face opposite said end face for communicating with said cylinder block port, said opposed faces providing a fluid flow path therebetween, a pair of means for communicating said opposed faces to ambient pressure in said apparatus, one of said means being substantially equally spaced radially inwardly from each of said ports of said cylinder block and from each of said ports on said valving plate face and the other of said means being substantially equally spaced radially outwardly from each of said ports of said cylinder block and from each of said ports on said valving plate face, one of said faces comprising recessed portions located between each of said ports and each of said means, each of said recessed portions being located adjacent to and intersecting the peripheral edge of its respective port, the depth of each recessed portion being substantially equal and within the range of .0001″ and .003″, the width of each recessed portion located between its respective one of said ports and said one means being substantially equal and the ratio of the width thereof to the distance said one means is spaced therefrom being between 0.4 and 10, the width of each recessed portion located between its respective one of said ports and said other means being substantially equal and the ratio of the width thereof to the distance said other means is spaced therefrom being between 0.4 and 10.

8. In a fluid displacement apparatus: a cylinder block having at least one fluid displacement chamber therein opening into a respective port on one end face thereof, a valving plate located opposite said end face and having at least one port opening into the face opposite said end face for communicating with said cylinder block port, said opposed faces providing a fluid flow path therebetween, a pair of means for communicating said opposed faces to ambient pressure in said apparatus, one of said means being spaced radially inwardly from each of said ports and the other of said means being spaced radially outwardly from each of said ports, each of said faces comprising a recessed portion located between its respective port and one of said means, each of said recessed portions being located adjacent to and intersecting the peripheral edge of its respective port, the combined depth of said recessed portion on one of said faces and said recessed portion on the other of said faces being within the range of .0001″ and .003″, the ratio of the width of each recessed portion to the distance said one means is spaced therefrom being between 0.4 and 10.

9. In a fluid displacement apparatus: a cylinder block having at least one fluid displacement chamber therein opening into a respective port on one end face thereof, a valving plate located opposite said end face and having at least one port opening into the face opposite said end face for communicating with said cylinder block port, said opposed faces providing a fluid flow path therebetween, a pair of means for communicating said opposed faces to ambient pressure in said apparatus, one of said means being spaced radially inwardly from each of said ports and the other of said means being spaced radially outwardly from each of said ports, each of said faces comprising recessed portions located between its respective port and each of said means, each of said recessed portions being located adjacent to and intersecting the peripheral edge of its respective port, the combined depth of one of said recessed portions on one of said faces and one of said recessed portions on the other of said faces being within the range of .0001″ and .003″, the ratio of the width of each recessed portion located between its respective one of said ports and said one means to the distance said one means is spaced therefrom being between 0.4 and 10, the ratio of the width of each recessed portion located between its respective one of said ports and said other means to the distance said other means is spaced therefrom being between 0.4 and 10.

10. In a fluid displacement apparatus: a cylinder block having a plurality of fluid displacement chambers therein opening into a plurality of ports on one end face thereof, a valving plate located opposite said end face and having a plurality of ports opening into the face opposite said end face for communicating with said cylinder block port, said opposed faces providing a fluid flow path therebetween, a pair of means for communicating said opposed faces to ambient pressure in said apparatus, one of said means being substantially equally spaced radially inwardly from each of said ports of said cylinder block and from each of said ports on said valving plate face and the other of said means being substantially equally spaced radially outwardly from each of said ports of said cylinder block and from each of said ports on said valving plate face, each of said faces comprising recessed portions located between its respective ports and one of said means, each of said recessed portions being located adjacent to and intersecting the peripheral edge of its respective port, the depth of each recessed portion on said valving plate face being substantially equal and the depth of each recessed portion on said cylinder block face being substantially equal, the combined depth of one of said recessed portions on one of said faces and one of said recessed portions on the other of said faces being within the range of .0001" and .003", the width of each recessed portion being substantially equal and the ratio of the width thereof to the distance said one means is spaced therefrom being between 0.4 and 10.

11. In a fluid displacement apparatus: a cylinder block having a plurality of fluid displacement chambers therein opening into a plurality of ports on one end face thereof, a valving plate located opposite said end face and having a plurality of ports opening into the face opposite said end face for communicating with said cylinder block port, said opposed faces providing a fluid flow path therebetween, a pair of means for communicating said opposed faces to ambient pressure in said apparatus, one of said means being substantially equally spaced radially inwardly from each of said ports of said cylinder block and from each of said ports on said valving plate face and the other of said means being substantially equally spaced radially outwardly from each of said ports of said cylinder block and from each of said ports on said valving plate face, each of said faces comprising recessed portions located between its respective ports and each of said means, each of said recessed portions being located adjacent to and intersecting the peripheral edge of its respective port, the depth of each recessed portion on said valving plate face being substantially equal and the depth of each recessed portion on said cylinder block face being substantially equal, the combined depth of one of said recessed portions on on of said faces and one of said recessed portions on the other of said faces being within the range of .0001" and .003", the width of each recessed portion located between its respective one of said ports and said one means being substantially equal and the ratio of the width thereof to the distance said one means is spaced therefrom being between 0.4 and 10, the width of each recessed portion located between its respective one of said ports and said other means being substantially equal and the ratio of the width thereof to the distance said other means is spaced therefrom being between 0.4 and 10.

12. In a fluid displacement apparatus: a pair of spaced cylinder blocks each having at least one fluid displacement chamber therein opening into a respective port on one end face thereof, a valving plate located between said end faces of said cylinder blocks and having at least one port opening into a pair of faces opposite a respective one of said end faces for communicating with said cylinder block ports, each pair of opposed faces providing a fluid flow path therebetween, a pair of means for each pair of opposed faces for communicating each pair of opposed faces to ambient pressure in said apparatus, one of said means of each pair of means being spaced radially inwardly from each of its respectively ports and the other of said means of each pair of means being spaced radially outwardly from each of its respective ports, one of said faces of each opposed pair of faces comprising a recessed portion located between its respective said port and a respective one of said means, each of said recessed portions being located adjacent to and intersecting the peripheral edge of its respective port, the depth of each recessed portion being within the range of .0001" and .003", the ratio of the width of each recessed portion to the distance its respective said one means is spaced therefrom being between 0.4 and 10.

13. In a fluid displacement apparatus: a pair of spaced cylinder blocks each having at least one fluid displacement chamber therein opening into a respective port on one end face thereof, a valving plate located between said end faces of said cylinder blocks and having at least one port opening into a pair of faces opposite a respective one of said end faces for communicating with said cylinder block ports, each pair of opposed faces providing a fluid flow path therebetween, a pair of means for each pair of opposed faces for communicating each pair of opposed faces to ambient pressure in said apparatus, one of said means of each pair of means being spaced radially inwardly from each of its respective ports and the other of said means of each pair of means being spaced radially outwardly from each of its respective ports, one of said faces of each opposed pair of faces comprising recessed portions located between its respective said port and each of said means, each of said recessed portions being located adjacent to and intersecting the peripheral edge of its respective port, the depth of each recessed portion being within the range of .0001" and .003", the ratio of the width of the recessed portion located between its respective port and its respective said one means to the distance its respective said one means is spaced therefrom being between 0.4 and 10, the ratio of the width of the recessed portion located between its respective port and its respective said other means to the distance its respective said other means is spaced therefrom being between 0.4 and 10.

14. In a fluid displacement apparatus: a pair of spaced cylinder blocks each having a plurality of fluid displacement chambers therein opening into a plurality of respective ports on one end face thereof, a valving plate located between said end faces of said cylinder blocks and having a plurality of ports opening into a pair of faces opposite a respective one of said end faces for communicating with said cylinder block ports, each pair of opposed faces providing a fluid flow path therebetween, a pair of means for each pair of opposed faces for communicating each pair of opposed faces to ambient pressure in said apparatus, one of said means of each pair of means being substantially equally spaced radially inwardly from each of its respective ports on said cylinder block face and from each of its respective ports on said valving plate face and the other of said means of each pair of means being substantially equally spaced radially outwardly from each of its respective ports on said cylinder block face and from each of its respective ports and said valving plate face, one of said faces of each opposed pair of faces comprising recessed portions located between each of its respective ports and a respective one of said means, each of said recessed portions being located adjacent to and intersecting the peripheral edge of its respective port, the depth of each recessed portion on each face being substantially equal and within the range of .0001" and .003", the width of each recessed portion on each face being substantially equal and the ratio of the width thereof to the distance its respective said one means is spaced therefrom being between 0.4 and 10.

15. In a fluid displacement apparatus: a pair of spaced cylinder blocks each having a plurality of fluid displacement chambers therein opening into a plurality of respective ports on one end face thereof, a valving plate located between said end faces of said cylinder blocks and having a plurality of ports opening into a pair of faces opposite a respective one of said end faces for communicating with said cylinder block ports, each pair of opposed faces providing a fluid flow path therebetween, a pair of means for each pair of opposed faces for communicating each pair of opposed faces to ambient pressure in said apparatus, one of said means of each pair of means being substantially equally spaced radially inwardly from each of its respective ports on said cylinder block face and from each of its respective ports on said port valving face and the other of said means of each pair of means being substantially equally spaced radially outwardly from each of its respective ports on said cylinder block face and from each of its respective parts on said valving place face, one of said faces of each opposed pair of faces comprising recessed portions located between each of its respective ports and each of its respective said means, each of said recessed portions being located adjacent to and intersecting the peripheral edge of its respective port, the depth of each recessed portion on each face being substantially equal and within the range of .0001" and .003", the width of each recessed portion on each face located between its respective one of said ports and its respective said one means being substantially equal and the ratio of the width thereof to the distance its respective said one means is spaced therefrom being between 0.4 and 10, the width of each recessed portion on each face located between its respective one of said ports and its respective said other means being substantially equal and the ratio of the width thereof to the distance its respective said other means is spaced therefrom being between 0.4 and 10.

16. In a fluid displacement apparatus: a pair of spaced cylinder blocks each having at least one fluid displacement chamber therein opening into a respective port on one end face thereof, a valving plate located between said faces of said cylinder blocks and having at least one port opening into a pair of faces opposite a respective one of said end faces for communicating with said cylinder block ports, each pair of opposed faces providing a fluid flow path therebetween, a pair of means for each pair of opposed faces for communicating each pair of opposed faces to ambient pressure in said apparatus, one of said means of each pair of means being spaced radially inwardly from each of its respective ports and the other of said means of each pair of means being spaced radially outwardly from each of its respective ports, each of said faces of each opposed pair of faces comprising recessed portions located between its respective port and a respective one of said means, each of said recessed portions being located adjacent to and intersecting the peripheral edge of its respective port, the combined depth of said recessed portion on one of said faces of each pair of opposed faces and of said recessed portion on the other of said faces of each pair of opposed faces being within the range of .0001" and .003", the ratio of the width of each recessed portion to the distance its respective said one means is spaced therefrom being between 0.4 and 10.

17. In a fluid displacement apparatus: a pair of spaced cylinder blocks each having at least one fluid displacement chamber therein opening into a respective port on one end face thereof, a valving plate located between said faces of said cylinder blocks and having at least one port opening into a pair of faces opposite a respective one of said end faces for communicating with said cylinder block ports, each pair of opposed faces providing a fluid flow path therebetween, a pair of means for each pair of opposed faces for communicating each pair of opposed faces to ambient pressure in said apparatus, one of said means of each pair of means being spaced radially inwardly from each of its respective ports and the other of said means of each pair of means being spaced radially outwardly from each of its respective ports, each of said faces of each opposed pair of faces comprising recessed portions located between its respective port and each of said means, each of said recessed portions being located adjacent to and intersecting the peripheral edge of its respective port, the combined depth of one of said recessed portions on one of said faces of each pair of opposed faces and one of said recessed portions on the other of said faces of each pair of opposed faces being within the range of .0001" and .003", the ratio of the width of each recessed portion located between its respective one of said ports and its respective said one means to the distance its respective said one means is spaced therefrom being between 0.4 and 10, the ratio of the width of each recessed portion located between its respective one of said ports and its respective said other means to the distance its respective said other means is spaced therefrom being between 0.4 and 10.

18. In a fluid displacement apparatus: a pair of spaced cylinder blocks each having a plurality of fluid displacement chambers therein opening into a plurality of ports on one end face thereof, a valving plate located between said faces of said cylinder blocks and having a plurality of ports opening into a pair of faces opposite a respective one of said end faces for communicating with said cylinder block ports, each pair of opposed faces providing a fluid flow path therebetween, a pair of means for each pair of opposed faces for communicating each pair of opposed faces to ambient pressure in said apparatus, one of said means of each pair of means being substantially equally spaced radially inwardly from each of its respective ports on said cylinder block face and from each of its respective ports on said valving plate face and the other of said means of each pair of means being substantially equally spaced radially outwardly from each of its respective ports on said cylinder block face and from each of its respective ports on said valving plate face, each of said faces of each opposed pair of faces comprising recessed portions located between its respective ports and a respective one of said means, each of said recessed portions being located adjacent to and intersecting the peripheral edge of its respective port, the depth of each recessed portion on each face of said port plate being substantially equal and the depth of each recessed portion on each cylinder block face being substantially equal, the combined depth of one of said recessed portions on one of said faces of each pair of opposed faces and one of said recessed portions on the other of said faces of each pair of opposed faces being within the range of .0001" and .003", the width of each recessed portion on each face being substantially equal and the ratio of the width thereof to the distance its respective said one means is spaced therefrom being between 0.4 and 10.

19. In a fluid displacement apparatus: a pair of spaced cylinder blocks each having a plurality of fluid displacement chambers therein opening into a plurality of ports on one end face thereof, a valving plate located between said faces of said cylinder blocks and having a plurality of ports opening into a pair of faces opposite a respective one of said end faces for communicating with said cylinder block ports, each pair of opposed faces providing a fluid flow path therebetween, a pair of means for each pair of opposed faces for communicating each pair of opposed faces to ambient pressure in said apparatus, one of said means of each pair of means being substantially equally spaced radially inwardly from each of its respective ports on said cylinder block face and from each of its respective ports on said valving plate face and the other of said means of each pair of means being substantially equally spaced radially outwardly from each of its respective ports on said cylinder block face and from each of its respective ports on said valving plate face, each of said faces of each opposed pair of faces comprising recessed portions located between its respective ports and each of said means, each of said recessed portions being located adjacent to and intersecting the peripheral edge of its respective port, the depth of each recessed portion on each face of said valving plate face being substantially equal and the depth of each recessed portion on each cylinder block face being substantially equal, the combined depth of one of said recessed portions on one of said faces of each pair of opposed faces and one of said recessed portions on the other of said faces of each pair of opposed faces being within the range of .0001" and .003", the width of each recessed portion on each face located between its respective one of said ports and its respective said one means being substantially equal and the ratio of the width thereof to the distance its respective said one means is spaced therefrom being between 0.4 and 10, the width of each recessed portion on each face located between its respective one of said ports and its respective said other means being substantially equal and the ratio of the width thereof to the distance its respective said other means is spaced therefrom being between 0.4 and 10.

References Cited in the file of this patent
UNITED STATES PATENTS

| | | |
|---|---|---|
| 1,867,308 | Durner | July 12, 1932 |
| 2,972,962 | Douglas | Feb. 28, 1961 |
| 3,036,434 | Mark | May 29, 1962 |
| 3,089,427 | Firth et al. | May 14, 1963 |

UNITED STATES PATENT OFFICE
CERTIFICATE OF CORRECTION

Patent No. 3,170,297                                  February 23, 1965

Ralph H. Larson

It is hereby certified that error appears in the above numbered patent requiring correction and that the said Letters Patent should read as corrected below.

Column 3, lines 59 and 60, equation "(1-B)" for that portion of the equation reading:

$$(\delta)^2 \quad\quad \text{read} \quad\quad (\delta)^3$$

column 4, lines 1 to 3, equation "(1-E)" for that portion of the equation reading:

$$(h+\delta)^2 \Delta_1^2 \quad\quad \text{read} \quad\quad (h+\delta)^3 \Delta_1^2$$

line 31, equation "(2-A)" should appear as shown below instead of as in the patent:

$$\delta = (\delta_o - X)$$

column 6, line 39, for "anugular" read -- angular --; line 50, for "oppening" read -- opening --; column 9, line 52, for "respectively" read -- respective --.

Signed and sealed this 14th day of September 1965.

(SEAL)
Attest:

ERNEST W. SWIDER                              EDWARD J. BRENNER
Attesting Officer                               Commissioner of Patents